United States Patent
Ku

(10) Patent No.: US 7,103,705 B2
(45) Date of Patent: Sep. 5, 2006

(54) COMPUTING SYSTEM, AND METHOD FOR ENABLING A DIGITAL SIGNAL PROCESSOR TO ACCESS PARAMETER TABLES THROUGH A CENTRAL PROCESSING UNIT

(75) Inventor: Po-Wen Ku, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 217 days.

(21) Appl. No.: 10/352,701

(22) Filed: Jan. 27, 2003

(65) Prior Publication Data

US 2004/0158684 A1    Aug. 12, 2004

(30) Foreign Application Priority Data

Jun. 7, 2002    (TW) ............... 91112417 A

(51) Int. Cl.
*G06F 12/00*    (2006.01)
(52) U.S. Cl. ............... 711/100; 712/35; 711/170
(58) Field of Classification Search ........ 711/147–153, 711/100, 154, 214, 170; 455/341; 713/1; 712/35, 34
See application file for complete search history.

(56) References Cited

U.S. PATENT DOCUMENTS

| | | | |
|---|---|---|---|
| 5,630,153 A | | 5/1997 | Intrater et al. |
| 6,148,389 A * | | 11/2000 | So ............... 712/35 |
| 6,154,830 A | | 11/2000 | Sugimura |
| 6,230,255 B1 * | | 5/2001 | Asghar et al. ............ 712/32 |
| 6,353,863 B1 | | 3/2002 | Nakagawa et al. |
| 6,678,765 B1 * | | 1/2004 | Moscovici et al. ......... 710/72 |
| 6,925,641 B1 * | | 8/2005 | Elabd ............... 711/100 |

| | | | |
|---|---|---|---|
| 2002/0103985 A1 * | 8/2002 | Gruber | 711/215 |
| 2003/0009656 A1 * | 1/2003 | Yamamura | 713/1 |

FOREIGN PATENT DOCUMENTS

| | | |
|---|---|---|
| EP | 0 465 054 A1 | 1/1992 |
| EP | 0 576 409 A1 | 12/1993 |
| EP | 0 817 011 A1 | 1/1998 |
| KR | 2002085404 | * 11/2002 |
| WO | WO 200157664 A | * 8/2005 |

OTHER PUBLICATIONS

"Real-time digital signal processing: A review of applications and Technology", A.G.Carr, Computer and Control Engineering Journal,Mar.,1990,pp. 77-80.*

* cited by examiner

*Primary Examiner*—Pierre-Michel Bataille
(74) *Attorney, Agent, or Firm*—Thomas, Kayden, Horstemeyer & Risley

(57) ABSTRACT

A computing system includes a digital signal processor, a storage medium for storing parameter tables, a central processing unit coupled to the digital signal processor and the storage medium, and a shared memory coupled to the digital signal processor and the central processing unit. The digital signal processor stores a data request in the shared memory and issues a request command to the central processing unit when access to the parameter tables is desired. Upon receipt of the request command, the central processing unit reads the data request in the shared memory, accesses the storage medium for retrieving requested data that corresponds to the data request, stores the requested data in the shared memory, and issues a response command to the digital signal processor. The digital signal processor retrieves the requested data from the shared memory upon receipt of the response command from the central processing unit.

27 Claims, 5 Drawing Sheets

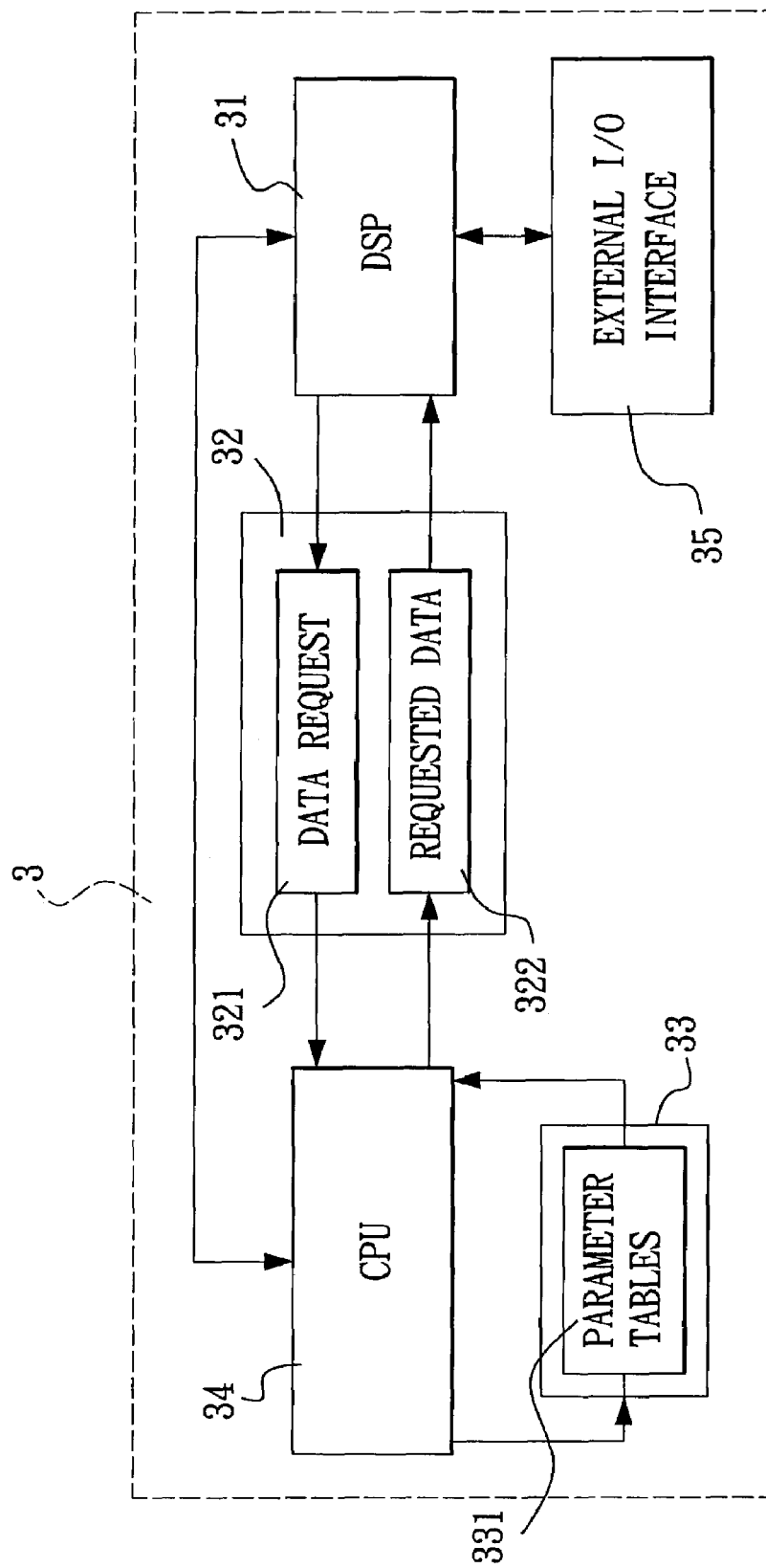
F I G. 3

COMPUTING SYSTEM, AND METHOD FOR ENABLING A DIGITAL SIGNAL PROCESSOR TO ACCESS PARAMETER TABLES THROUGH A CENTRAL PROCESSING UNIT

BACKGROUND OF THE INVENTION

1. Field of the Invention

The invention relates to a computing system, more particularly to a method for enabling a digital signal processor in a computing system to access parameter tables through a central processing unit.

2. Description of the Related Art

A central processing unit (CPU) is responsible for peripheral components control, logic operations, arithmetic operations, instructions decoding and execution, etc., and is the control center of a computer system. Since the main function of the central processing unit is peripheral components control, the central processing unit is suitable for performing only simple arithmetic operations like addition and subtraction, and is not suitable for performing complex mathematical computations or logic operations. When the central processing unit is instructed to perform the complex mathematical computations or logic operations, poor operating efficiency (i.e., low computational speed or even inoperability) will occur. A digital signal processor (DSP) is specially designed for performing complex arithmetic computations involving addition, subtraction, multiplication and division, and complex logic operations in a low power but highly efficient manner. Therefore, a central processing unit usually operates in combination with a digital signal processor for improving digital computation efficiency in a system, such as a digital versatile disc (DVD) player, or a mobile phone, etc.

FIG. 1 illustrates a conventional system 1 that incorporates a digital signal processor (DSP) 11. The DSP 11 is electrically connected to an external input/output (I/O) interface 13 and a memory unit 12. The memory unit 12 includes a read-only memory (ROM) 121 and a random access memory (RAM) 122, and stores program code and data for the operations of the DSP 11. In general, the digital computations performed by the DSP 11 involve algorithms that require the use of parameter tables. For example, in voice recognition applications, parameter tables are needed for judgment after analytical computation of sound. Moreover, in the formula $Y=aX^2+bX+c$, where X is an input signal, Y is an output signal, and a, b and c are parameters, the number of possible results could be quite enormous in view of the possible combinations of the parameters (a, b, c). For example, assuming that a, b, c are 4-bit data, the possible combinations can amount to $16*16*16 \approx 4000$. Parameter tables formed from the possible parameter combinations can be stored in the ROM 121 beforehand such that, when needed by the DSP 11, the relevant data can be retrieved from the memory unit 12 through appropriate addressing. This method of memory access is called direct addressing and can be completed in one computing cycle. The external I/O interface 13 is electrically connected to an external circuit. Thus, the DSP 11 can be used for digital computations in order to improve the system computing efficiency.

At present, the data width of the DSP 11 is widely designed as 16 bits. The addressable space of the DSP 11 is thus limited to 64 KB ($2^{16}$=64 KB). If the size of the parameter tables is more than 64 KB, the parameter tables cannot be stored in the memory unit 12. In practice, limitations on the size of the parameter tables may be even more restricted, because the addressable space must include the ROM 121, the RAM 122 and a memory map for the external I/O interface 13. Therefore, the size of the addressable space allocated for the parameter tables is actually less than 64 KB. Moreover, the system 1 of FIG. 1 is usually designed as a single packaged chip. In view of cost and size considerations, the capacity of the memory unit 12 is usually only around 2 KB. Since the memory unit 12 has space reserved for storing program code and other data, it is evidently impractical for parameter tables having sizes greater than 1 KB to be stored in the memory unit 12 for data access by the DSP 11 using the conventional direct addressing method.

In many applications, such as digital signal processing in voice recognition, image processing, mobile phone communications and video signal interfacing, etc., the size of parameter tables is generally larger than 64 KB. Thus, the parameter tables cannot be stored in the memory unit 12. Therefore, the system 1 must be configured to cooperate with an external memory having slower access speed (such as flash memory or dynamic random access memory). The external memory configuration is shown in FIG. 2. As illustrated, the external I/O interface 13' of a system 1' that is identical in structure to the system 1 of FIG. 1 is coupled to an external memory 21 which has the parameter tables stored therein. The external I/O interface 13' relies upon indirect addressing to access data from the external memory 21.

The following are some of the drawbacks associated with the conventional configuration of FIG. 2:

1. Additional external circuits are needed. Because the external memory 21 is accessed by indirect addressing, there is a need to provide an address register 22 for temporary storage of the address of requested data, a data register 23 for temporary storage of data retrieved from the external memory 21, and an access control circuit 24 (for example, a direct memory access (DMA) controller) so that data corresponding to the address in the address register 22 may be retrieved from the external memory 21 and stored in the data register 23 for subsequent use by the DSP 11' in the system 1', thereby resulting in increased components costs.

2. Computing time is increased. When the DSP 11' accesses the parameter tables through the external circuits 22, 23 and 24, an address is first written into the address register 22, and the access control circuit 24 then retrieves the requested data from the external memory 21 in accordance with the address in the address register 22 and stores the requested data in the data register 23 for subsequent access by the DSP 11' through the external I/O interface 13'. Therefore, instead of directly accessing data from an internal memory unit 12 as done by the DSP 11 in the aforesaid system 1 of FIG. 1, extra steps are required for reading data through the external circuits 22, 23 and 24 such that data reading cannot be completed in one computing cycle. Moreover, when the DSP 11' issues a request for data, the DSP 11' cannot proceed with other operations until the requested data is provided thereto. Therefore, the computing time is increased, and the computing efficiency and speed of the DSP 11' are decreased.

The data width of a commercially available central processor unit is 32 bits, thus resulting in an addressable space of as high as 4 gigabytes ($2^{32} \approx 4*10^6$). The capacity of a computer memory (for example, flash memories, dynamic random access memories, etc.) used with a central processing unit can also be enormous. Together, the central processing unit and the computer memory will have adequate addressable space and memory capacity for parameter table utilization. Since a central processing unit has an inherent memory access function and is used in combination with a digital signal processor, if a method for enabling the digital signal processor in a computing system to access parameter tables through the central processing unit is provided, the aforesaid drawbacks can be overcome.

SUMMARY OF THE INVENTION

Therefore, the main object of the present invention is to provide a method for enabling a digital signal processor in a computing system to access parameter tables stored in a storage medium through a central processing unit so as to obtain lower component costs and improve computing efficiency and speed.

Another object of the present invention is to provide a computing system that implements the inventive method.

According to one aspect of the present invention, there is provided a method for enabling a digital signal processor to access parameter tables stored in a storage medium. The digital signal processor and the storage medium are connected to a central processing unit. The method comprises the step of: when access to the parameter tables is desired, enabling the digital signal processor to inform the central processing unit such that requested data of the parameter tables is retrieved by the central processing unit from the storage medium and is outputted by the central processing unit for retrieval by the digital signal processor.

According to another aspect of the present invention, there is provided a method for enabling a digital signal processor to access parameter tables, comprising the steps of:

a) storing the parameter tables in a storage medium;

b) providing a central processing unit that is connected to the digital signal processor and the storage medium;

c) providing a shared memory that is connected to the digital signal processor and the central processing unit;

d) when access to the parameter tables is desired, enabling the digital signal processor to store a data request in the shared memory and to issue a request command to the central processing unit;

e) upon receipt of the request command, enabling the central processing unit to read the data request in the shared memory, to access the storage medium for retrieving requested data of the parameter tables that corresponds to the data request, to store the requested data in the shared memory, and to issue a response command to the digital signal processor; and f) upon receipt of the response command, enabling the digital signal processor to retrieve the requested data from the shared memory.

According to a further aspect of the present invention, there is provided a computing system that comprises a digital signal processor, a storage medium for storing parameter tables, a central processing unit coupled to the digital signal processor and the storage medium, and a shared memory coupled to the digital signal processor and the central processing unit.

The digital signal processor is configured to store a data request in the shared memory and to issue a request command to the central processing unit when access to the parameter tables is desired.

The central processing unit is configured to read the data request in the shared memory, to access the storage medium for retrieving requested data of the parameter tables that corresponds to the data request, to store the requested data in the shared memory, and to issue a response command to the digital signal processor upon receipt of the request command from the digital signal processor.

The digital signal processor is further configured to retrieve the requested data from the shared memory upon receipt of the response command from the central processing unit.

BRIEF DESCRIPTION OF THE DRAWINGS

Other features and advantages of the present invention will become apparent in the following detailed description of the preferred embodiment with reference to the accompanying drawings, of which:

FIG. 3 is a schematic block diagram of the preferred embodiment of a computing system according to the present invention;

DETAILED DESCRIPTION OF THE PREFERRED EMBODIMENT

Figure 1:
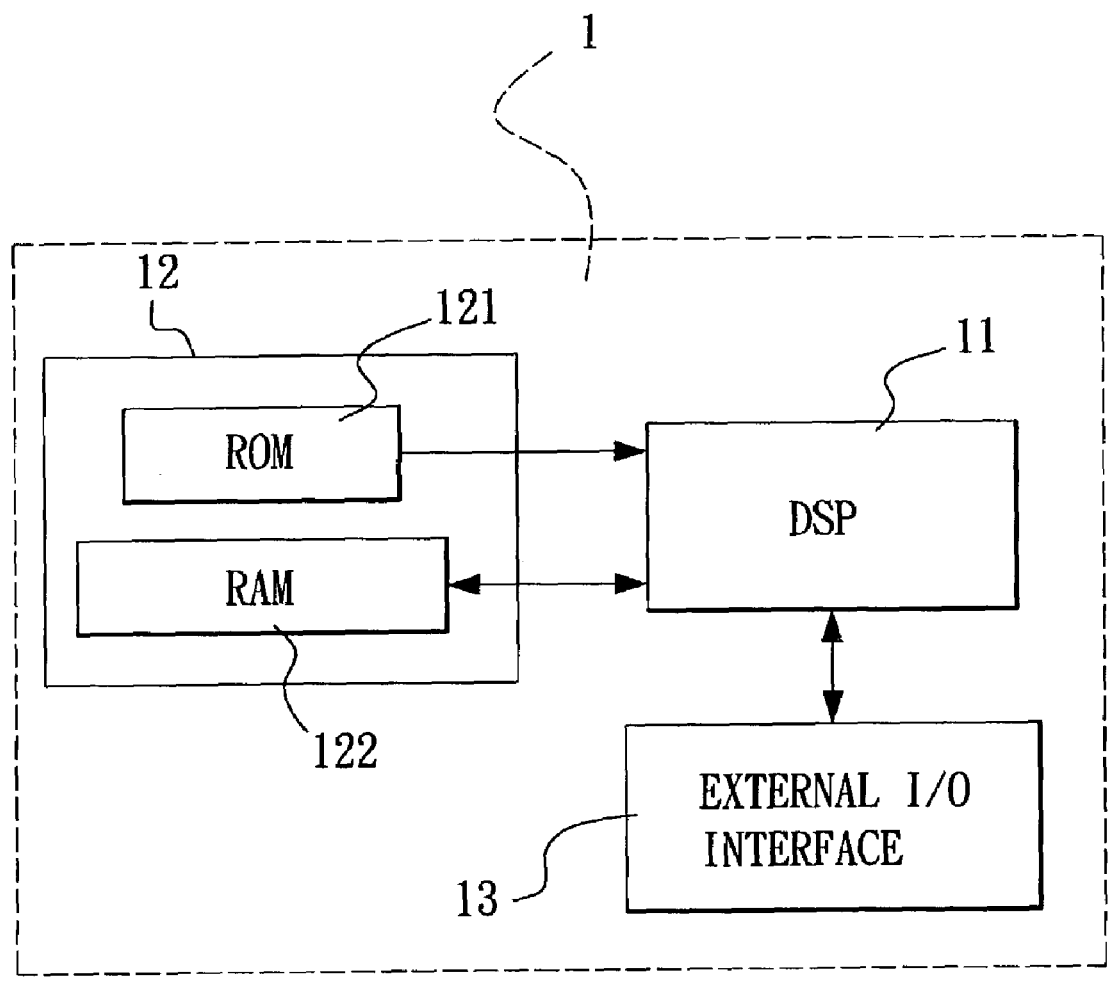
FIG. 1 is a schematic block diagram showing a conventional system that incorporates a digital signal processor.

As mentioned hereinabove, in order to improve system computing efficiency, the design of present computing systems, such as digital versatile disc (DVD) players, mobile phones, image processing system, voice recognition systems, etc., generally involves the use of a digital signal processor (DSP) in combination with a central processing unit (CPU). Since the CPU has an inherent data access function, and since the CPU has an addressable space (for example, 4 GB) that is much larger than that of the DSP (usually 64 KB), this invention enables the DSP to access parameter tables stored in the storage medium through the CPU.

Referring to FIG. 3, one preferred embodiment of a computing system 3 according to the present invention is shown to include a DSP 31, a shared memory 32, a storage medium 33 and a CPU 34. The DSP 31 is mainly used for performing complex arithmetic computations involving addition, subtraction, multiplication and division, and complex logic operations in a low power but highly efficient manner. Algorithms for performing digital computations involve referring to data in parameter tables. In this embodiment, when the DSP 31 needs to refer to data in the parameter tables, a request command and a data request 321 will be outputted thereby. The data request 321 includes at least an index for indicating the location of the requested data in the parameter tables. The request command is used to inform the CPU 34 that assistance is required by the DSP 31 from the CPU 34 to retrieve the requested data from the parameter tables.

The shared memory 32 is coupled electrically to the DSP 31 and the CPU 34 and is used to temporarily store the data request 321 from the DSP 31. In order to be compatible with the addressable space of 64 KB of the DSP 31 (which usually has a 16-bit data width), the capacity of the shared memory 32 in this embodiment is preferably not more than 64 KB. Depending on actual design requirements, the shared memory 32 may be implemented as an internal memory, such as a random access memory built into the same package as the DSP 31, or as an external memory, such as a dynamic random access memory (DRAM) that is external to the package of the DSP 31.

The storage medium 33 is coupled electrically to the CPU 34, and has program code and data needed for operation of the computing system 3 stored therein. Since the addressable space of the CPU 34 having a data width of 32 bits is as high as 4 GB, the storage capacity of the storage medium 33 can be much higher than that of the internal memory of the DSP 31, which is only about 64 KB. In this embodiment, the storage medium 33 is external to the CPU 34, i.e., the storage medium 33 is not disposed in the same chip as the CPU 34. As such, when compared to an internal memory, the storage medium 33 offers the advantage of a large storage space capacity at a relatively low cost. In view of this, instead of storing parameter tables in the internal memory dedicated to the DSP 31 as taught in the prior art, the parameter tables 331 needed for digital computations by the DSP 31 are stored in the storage medium 33 in the computing system 3 of this embodiment. Moreover, the storage medium 33 of this embodiment can be implemented using various types of external computer memory not embedded in the same chip as the CPU 34, such as a flash memory, a dynamic random access memory (DRAM), an electrically erasable programmable read only memory (EEPROM), a read only memory (ROM), a hard disk, a floppy disk, etc. Also, the storage medium 33 has a larger capacity than the shared memory 32. For instance, if the storage medium 33 is a flash memory, the storage space could be 2 MB to 8 MB. If the storage medium 33 is a hard disk, the storage space could be as large as 100 GB. If the storage medium 33 is a dynamic random access memory, the storage space could be 4 MB to 256 MB. Furthermore, the storage medium 33 can be a combination of various types of external computer memory, and is not limited to those mentioned hereinabove.

The CPU 34 is coupled electrically to the DSP 31, the storage medium 33 and the shared memory 32, and is the control center of the computing system 3. In other words, the CPU 34 controls peripheral components (such as the storage medium 33, the shared memory 32, etc.) and can operate according to external instructions. Therefore, when the CPU 34 receives the request command from the DSP 31, the CPU 34 will retrieve the data request 321 from the shared memory 32, access the storage medium 33 in accordance with the data request 321 for retrieving the requested data of the parameter tables 331, store the requested data 322 in the shared memory 32, and issue a response command to the DSP 31 such that the DSP 31 will be informed to retrieve the requested data 322 from the shared memory 32 for proceeding with digital computations.

The computing system 3 of this embodiment further includes an external input/output (I/O) interface 35 as shown in FIG. 3 connected electrically to the DSP 31 and allowing connection of the DSP 31 to other external circuits or components for control or data exchange purposes.

Figure 4:
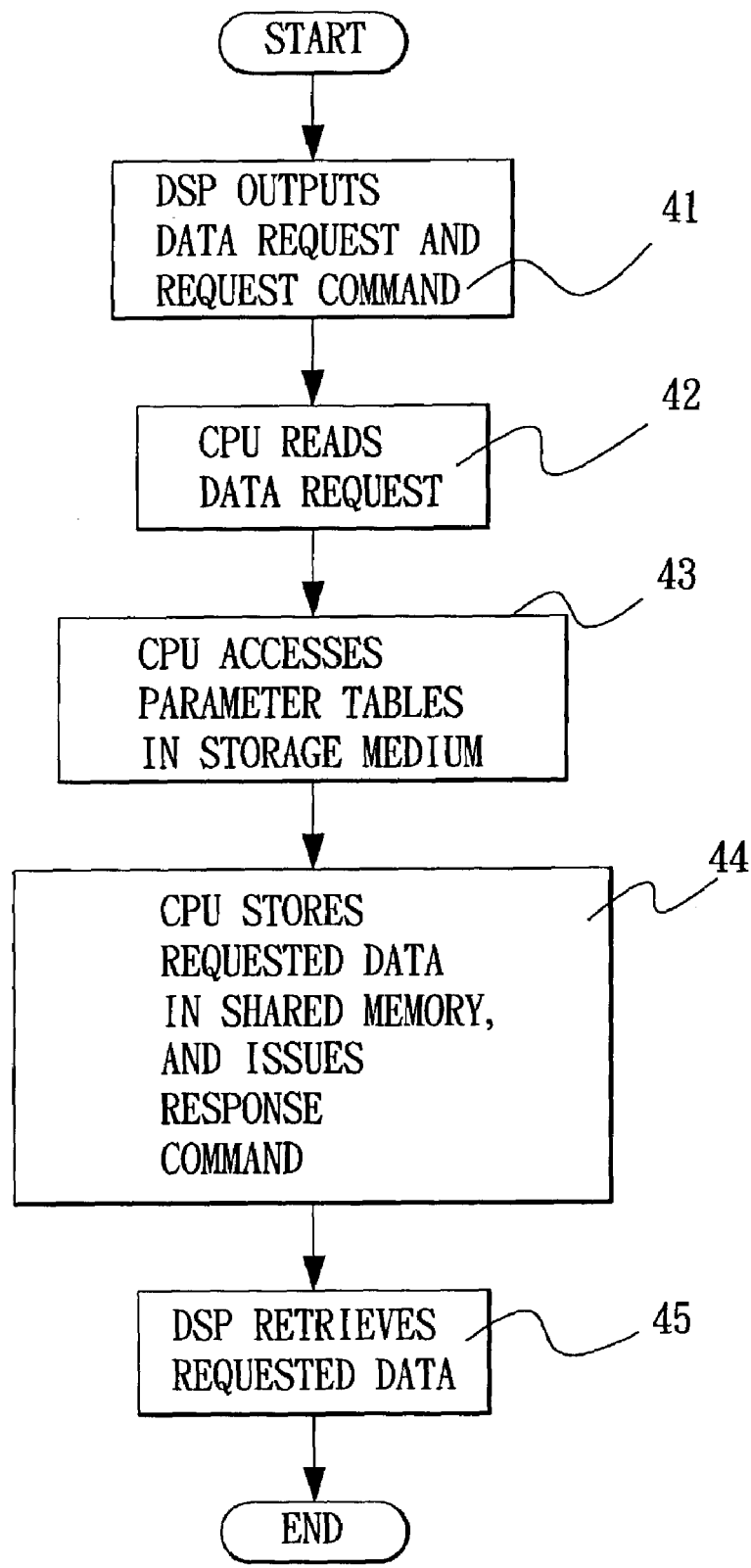
FIG. 4 is a flowchart illustrating the method of the preferred embodiment.

FIG. 4 is a flowchart illustrating consecutive steps of the inventive method performed by the computing system 3 of the preferred embodiment.

First, at step 41, when the DSP 31 requires data in the parameter tables 331, an index indicating the location of the requested data will be formed by the DSP 31 into a data request 321 that is stored in the shared memory 32, and the DSP 31 issues a request command to the CPU 34 to request assistance in accessing the parameter tables 331.

Then, at step 42, when the CPU 34 receives the request command from the DSP 31, the CPU 34 will retrieve the data request 321 from the shared memory 32, and the flow goes to step 43.

At step 43, the CPU 34 will analyze the data request 321, read the index, and access the requested data from the parameter tables 331 in the storage medium 33 accordingly.

Subsequently, at step 44, the CPU 34 stores the requested data 322 in the shared memory 32, and issues a response command back to the DSP 31.

Finally, at step 45, when the DSP 31 receives the response command from the CPU 34, the DSP 31 is enabled to retrieve the requested data 322 from the shared memory 32 for proceeding with digital computations. In this manner, the DSP 31 is able to access the parameter tables 331 stored in the storage medium 33 through the assistance of the CPU 34.

Because the DSP 31 is not responsible for directly accessing the parameter tables 331, after issuing the request command at step 41, the DSP 31 can perform calculations not relevant to the data request 321 in the shared memory 32. In the prior art, the DSP is not capable of performing calculations before the requested data has been obtained thereby. However, in the computing system 3 of this embodiment, the DSP 31 can store another data request 321 in the shared memory 32 and issue another request command to the CPU 34 prior to retrieving the requested data 322 associated with a previous data request 321 from the shared memory 32.

Figure 5:
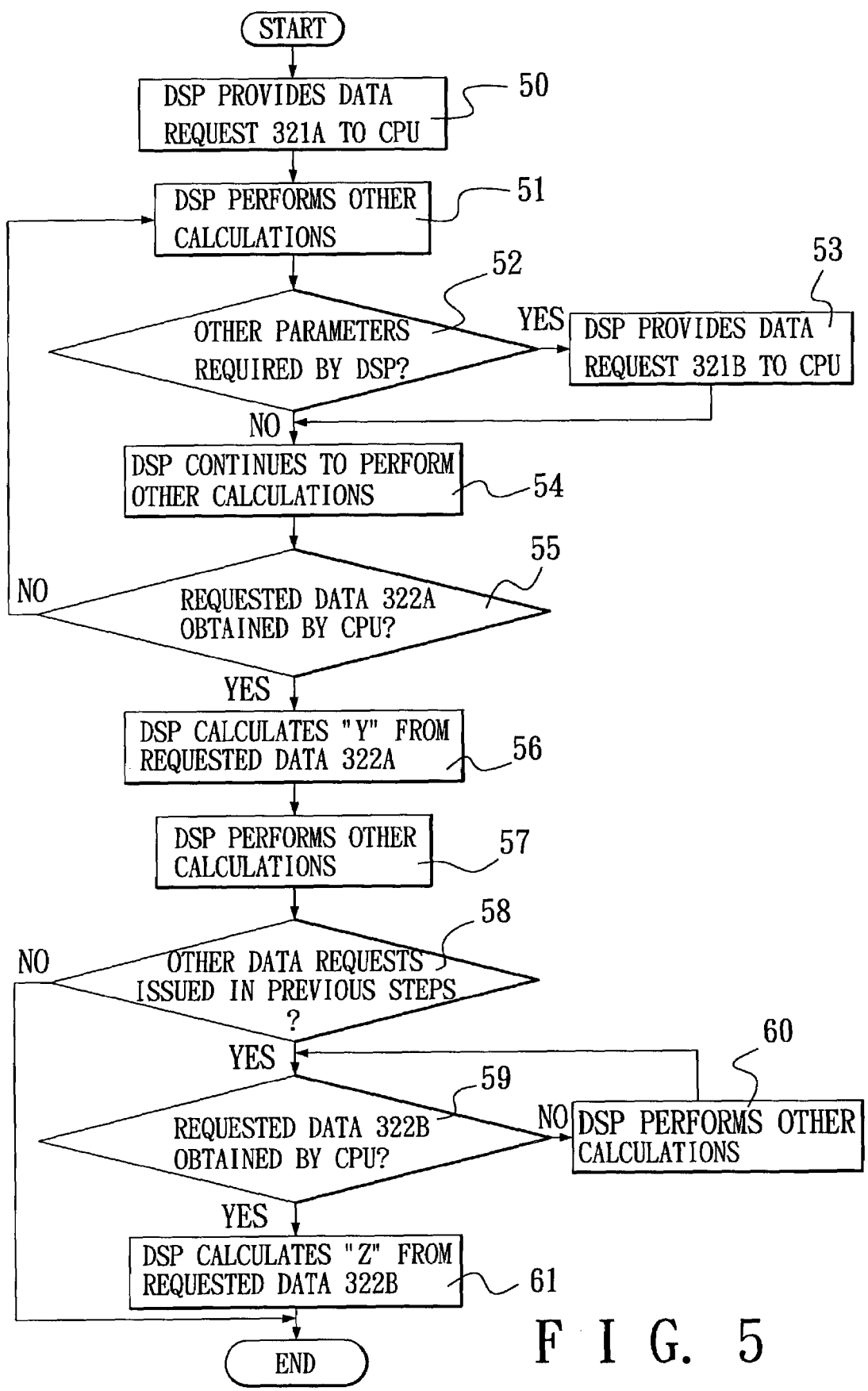
FIG. 5 is a flowchart showing consecutive steps of an illustrative operating flow of the computing system of FIG. 3.

FIG. 5 is a flowchart showing consecutive steps of an illustrative operating flow of the computing system of FIG. 3. In this example, it is assumed that the DSP 31 requires data in two parameter tables (Table 1 and Table 2) during computation. It is further assumed that the size of each parameter table is 1024*3 bytes. Parameter table (Table1) contains 1024 parameter sets (a, b, c) corresponding to formula I: $Y=aX^2+bX+c$. Parameter table (Table2) contains 1024 parameter sets (d, e, f) corresponding to formula II: $Z=dY^2+eY+f$. In this example, for the sake of simplicity, it is assumed that there are only two requests for data in the parameter tables in a single computing stage, which is sufficient to illustrate that the CPU 34 can be entrusted by the DSP 31 to process series of data requests without affecting the computing efficiency of the DSP 31.

First, at step 51, when the DSP 31 is executing a computation and realizes beforehand the need for two sets of parameter data from parameter table (Table1), a data request 321A will be provided by the DSP 31 to the CPU 34 through the shared memory 32 to request Table1[n1]=(an1, bn1, cn1), and Table1[n2]=(an2, bn2, cn2).

Afterwards, at step 51, the DSP 31 will perform calculations not relevant to the data request 321A, such as image processing, voice recognition, etc.

Then, at step 52, the DSP 31 determines whether subsequent computations require other parameters. If affirmative, the flow goes to step 53. Otherwise, the flow goes to step 54.

At step 53, assuming that a subsequent computation requires three sets of parameter data from parameter table (Table2), a data request 321B will be provided by the DSP 31 to the CPU 34 through the shared memory 32 to request Table2[n3]=(dn3, en3, fn3), Table2[n4]=(dn4, en4, fn4), and Table2[n5]=(dn5, en5, fn5). The flow then goes to step 54.

At step 54, the DSP 31 will continue to perform calculations not relevant to the data request 321A and the data request 321B.

It should be noted that during the same period that the DSP 31 executes steps 51 to 54, the CPU 34 proceeds to access requested data corresponding to the data request 321A. Therefore, in this example, it is assumed that the flow goes to step 55 after step 53 or 54 so as to confirm whether the CPU 34 has obtained the requested data 322A in response to the data request 321A. If negative, the flow goes back to step 51. Otherwise, the flow goes to step 56. It should be noted here that, when the CPU 34 has obtained the requested data 322A, the requested data 322A will be stored in the shared memory 32, and the response command will be sent by the CPU 34 to the DSP 31 to inform the DSP 31 that the data corresponding to the data request 321A is now available in the shared memory 32. Therefore, at step 56, the DSP 31 reads the requested data 322A from the shared memory 32 for computing the value of Y according to formula I.

Then, at step 57, the DSP 31 will continue to perform calculations not relevant to the data request 321B.

Thereafter, at step 58, the DSP 31 determines whether any other data request, such as the data request 321B, was issued in the previous steps (as in step 53). If affirmative, the flow goes to step 59. If negative, the flow goes to END.

At step 59, the DSP 31 determines whether the CPU 34 has obtained the requested data 322B corresponding to the data request 321B, i.e., whether the DSP 31 received the response command corresponding to the requested data 322B from the CPU 34. If affirmative, the flow goes to step 61. Otherwise, the flow goes to step 60. At step 60, the DSP 31 continues to perform other calculations not relevant to the data request 321B for a certain period, and the flow then goes back to step 59.

At step 61, the DSP 31 reads the requested data 322B from the shared memory 32 for computing the value of Z according to formula II. Afterwards, the flow for this example ends.

In sum, in the computing system 3 of this invention, the DSP 31 can first formulate data requests for subsequent calculations to be performed thereby so as to enable the CPU 34 to proceed with the access of the requested data while the DSP 31 continues to perform other calculations. Afterwards, when the DSP 31 needs the requested data, the DSP 31 can directly read the requested data 322 already stored in the shared memory 32 by the CPU 34. In this manner, the computing efficiency of the system 3 is improved.

The following are some of the advantages of the preferred embodiment of this invention:

1) Instead of storing the parameter tables in an internal memory (i.e., the memory embedded in the same chip as the DSP) as taught in the prior art of FIG. 1, the parameter tables 331 are stored in the storage medium 33 in the computing system 3 of this embodiment. Thus, there is no need to allocate addressable space of the DSP 31 and memory space in the internal memory embedded in the same chip as the DSP 31 for use by the parameter tables. The available addressable space and memory can therefore be utilized for other applications to further enhance the functionality of the DSP 31. At the same time, since there is no need to embed an internal memory with a large storage capacity in the same chip as the DSP 31, the component cost is also reduced.

Figure 2:
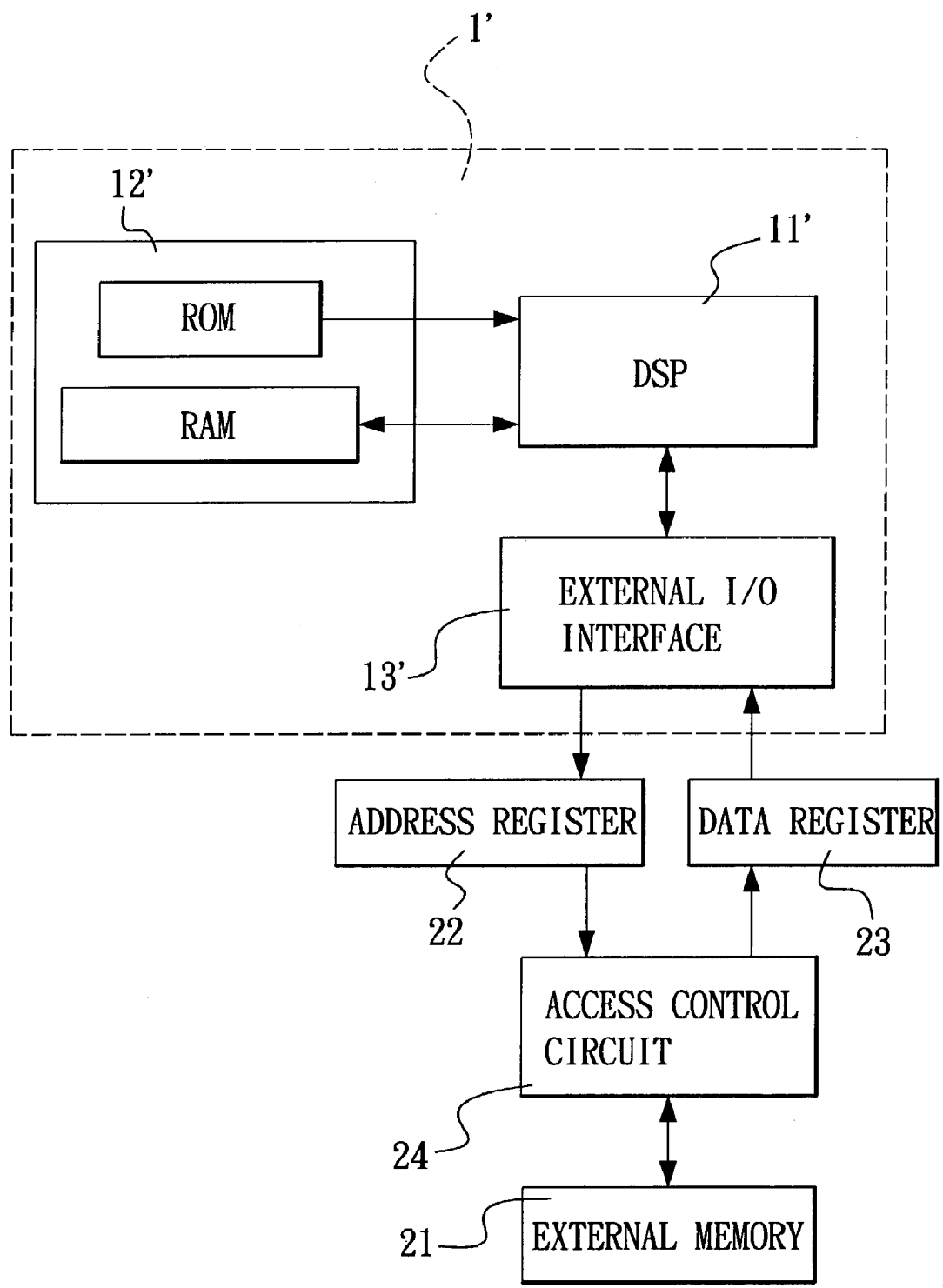
FIG. 2 is a schematic block diagram showing another conventional system that incorporates a digital signal processor and that accesses parameter tables from an external memory through an indirect addressing scheme.

2) Instead of storing parameter tables in an external memory and slowly accessing the same through the control of external circuits as taught in the prior art of FIG. 2, the parameter tables 331 in the storage medium 33 can be quickly accessed by the CPU 34 in view of the inherent characteristics of the latter. Moreover, when the DSP 31 expects the need of using some data in a later time frame, the DSP 31 can send the data requests 321 beforehand and continue with calculations irrelevant to the data requests. After a period of time when the DSP 31 really needs the data, the DSP 31 does not have to wait and can immediately obtain the requested data 322, which has already been prepared in the storage medium 33 by the CPU 34. In this manner, the shared memory 32 works like an always-hit cache memory in the sense that the requested data 322 is already present therein at the time it is actually needed by the DSP 31. In addition, since the requested data 322 was stored in the shared memory 32 by the CPU 34 in accordance with the data request 321 from the DSP 31, and is thus needed by the DSP 31 for subsequent calculations, the occurrence of access miss that is generally encountered in a cache memory can be avoided. It is worth noting that while the DSP must suspend processing until the requested data has been obtained thereby in the prior art of FIGS. 1 and 2, the DSP 31 in the computing system 3 of the preferred embodiment of this invention can perform other computations even when the requested data has yet to be stored in the shared memory 32. It is thus evident from the foregoing that the computing efficiency of the DSP 31 in the computing system 3 of this invention is greatly improved as compared to the prior art.

3) Instead of adding an external circuit for controlling data access of an external memory as taught in the prior art of FIG. 2, the CPU 34 is utilized in the computing system 3 of this invention for accessing the parameter tables 331 stored in the storage medium 33 without requiring additional external circuits, thus resulting in lower implementation costs.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A method for a DSP to retrieve data in a parameter table stored in a first memory having capacity beyond an allocation ability of the DSP, the method comprising the steps of:
   (a) requesting a CPU to access the parameter table in the first memory and store the data in a second memory, and
   (b) retrieving the data stored in the second memory; wherein the parameter table comprises a plurality of parameter sets corresponding to a function call; and the requested data comprises one or more parameter sets.

2. The method of claim 1, wherein the step (a) comprises storing a data request in the second memory and sending a request command to the CPU.

3. The method of claim 1, wherein the step (b) comprises receiving a response command from the CPU and reading the requested data in the second memory.

4. The method of claim 1, further comprising a step of:
   (a-1) performing an operation which is not related to the request to the CPU, wherein the step (a-1) is performed between the step (a) and the step (b).

5. A method for a CPU to receive a request from a DSP to retrieve data in a parameter table stored in a first memory, the parameter table having a size larger than an addressing capability of the DSP, the method comprising the steps of:
   a. receiving the request indicating the data to be retrieved;
   b. accessing the parameter table in the first memory;
   c. storing the data in a second memory, the second memory having a size within the addressing capability of the DSP, and
   d. informing the DSP that the requested data has been stored in the second memory; wherein:

the parameter table comprises a plurality of parameter sets corresponding to a function call; and the requested data comprises one or more parameter sets.

6. The method of claim 5, wherein the step (a) comprises receiving a request command from the DSP and reading a data request in the second memory.

7. The method of claim 5, wherein the step (d) comprises storing the requested data in the second memory and sending a response command to the DSP.

8. A method for enabling a digital signal processor to access parameter tables stored in a storage medium, wherein the capacity of storage medium is beyond an allocation ability of the digital signal processor, and the digital signal processor and the storage medium are separately connected to a central processing unit capable of allocating the storage medium, the method comprising the step of:

when access to the parameter tables is desired, enabling the digital signal processor to inform the central processing unit such that requested data of the parameter tables is retrieved by said central processing unit from the storage medium and is outputted by the central processing unit for retrieval by the digital signal; wherein:

each of the parameter tables comprises a plurality of parameter sets corresponding to a function call; and the requested data comprises one or more parameter sets obtained from at least one parameter table.

9. The method as claimed in claim 8, including the sub-steps of:

enabling the digital signal processor to store a data request in a shared memory and to issue a request command to the central processing unit; and upon receipt of the request command, enabling the central processing unit to read the data request in the shared memory, to access the storage medium for retrieving the requested data of the parameter tables that corresponds to the data request, to store the requested data in the shared memory, and to issue a response command to the digital signal processor.

10. The method as claimed in claim 9, further including the sub-step of: upon receipt of the response command, enabling the digital signal processor to retrieve the requested data from the shared memory.

11. The method as claimed in claim 9, wherein the data request includes at least an index for indicating location of the requested data in the storage medium.

12. The method as claimed in claim 9, further including the sub-step of: enabling the digital signal processor to perform calculations not relevant to the data request after storing the data request in the shared memory and issuing the request command to the central processing unit.

13. The method as claimed in claim 10, further including the sub-step of: prior to receipt of the response command, enabling the digital signal processor to store another data request in the shared memory and to issue another request command to the central processing unit.

14. A method for enabling a digital signal processor to access parameter tables, comprising the steps of:

a) storing the parameter tables in a storage medium having capacity beyond an allocation ability of the digital signal processor;

b) providing a central processing unit capable of allocating the storage medium, connected to the digital signal processor and the storage medium;

c) providing a shared memory that is connected to the digital signal processor and the central processing unit;

d) when access to the parameter tables is desired, enabling the digital signal processor to store a data request in the shared memory and to issue a request command to the central processing unit;

e) upon receipt of the request command, enabling the central processing unit to read the data request in the shared memory, to access the storage medium for retrieving requested data of the parameter tables that corresponds to the data request, to store the requested data in the shared memory, and to issue a response command to the digital signal processor; and f) upon receipt of the response command, enabling the digital signal processor to retrieve the requested data from the shared memory; wherein:

each of the parameter tables comprises a plurality of parameter sets corresponding to a function call; and the requested data comprises one or more parameter sets obtained from at least one parameter table.

15. The method as claimed in claim 14, wherein the data request includes at least an index for indicating location of the requested data in the storage medium.

16. The method as claimed in claim 14, wherein, between steps d) and f), the digital signal processor is enabled to perform calculations not relevant to the data request after storing the data request in the shared memory and issuing the request command to the central processing unit.

17. The method as claimed in claim 16, wherein, between steps d) and f), the digital signal processor is further enabled to store another data request in the shared memory and to issue another request command to the central processing unit.

18. The method as claimed in claim 16, wherein, in step f), the digital signal processor retrieves the requested data from the shared memory when the calculations not relevant to the data request are completed.

19. A system comprising:

a first processor with a first addressing capability;

a second processor with a second addressing capability larger than the first addressing capability;

a first memory storing a parameter table; and a second memory coupled to the first processor and the second processor, wherein:

when the first processor desires to retrieve data in the parameter table, the first processor requests the second processor to access the first memory and store the requested data into the second memory, and the second processor reads the requested data in the second memory, and the parameter table can only be accessed by the second processor, comprising a plurality of parameter sets corresponding to a function call; and the requested data comprises one or more parameter sets.

20. The system of claim 19, wherein the first processor comprises a DSP, the second processor comprises a CPU, the second memory comprises a volatile memory, and the first memory is not disposed in the same chip as the second processor.

21. The system of claim 19, wherein the first processor requests the second processor by storing a data request in the second memory and sending a request command to the second processor.

22. The system of claim 19, wherein when storing the requested data into the second memory, the second processor also sends a response command to the first processor.

23. A computing system comprising:

a digital signal processor;

a storage medium for storing parameter tables, having capacity beyond an allocation ability of the digital signal processor;

a central processing unit capable of allocating the storage medium, coupled to said digital signal processor and said storage medium; and a shared memory coupled to said digital signal processor and said central processing unit;

said digital signal processor being configured to store a data request in said shared memory and to issue a request command to said central processing unit when access to the parameter tables is desired;

said central processing unit being configured to read the data request in said shared memory, to access said storage medium for retrieving requested data of the parameter tables that corresponds to the data request, to store the requested data in said shared memory, and to issue a response command to said digital signal processor upon receipt of the request command from said digital signal processor;

said digital signal processor being further configured to retrieve the requested data from said shared memory upon receipt of the response command from said central processing unit; wherein:

each of the parameter tables comprises a plurality of parameter sets corresponding to a function call; and the requested data comprises one or more parameter sets obtained from at least one parameter table.

24. The computing system as claimed in claim 23, wherein the data request includes at least an index for indicating location of the requested data in said storage medium.

25. The computing system as claimed in claim 23, wherein said digital signal processor is further configured to perform calculations not relevant to the data request after issuing the request command to said central processing unit, and before receiving the response command from said central processing unit.

26. The computing system as claimed in claim 23, wherein said digital signal processor is further configured to store another data request in said shared memory and to issue another request command to said central processing unit when said digital signal processor has yet to receive the response command from said central processing unit.

27. The computing system as claimed in claim 23, wherein said storage medium is a computer memory external to said central processing unit.

* * * * *